US009674301B2

(12) United States Patent
Ma et al.

(10) Patent No.: US 9,674,301 B2
(45) Date of Patent: Jun. 6, 2017

(54) HOME GATEWAY DEVICES AND METHODS FOR FACILITATING CONNECTIONS BETWEEN CUSTOMER PREMISES EQUIPMENT DEVICES AND SERVERS

(71) Applicant: Rogers Communications Inc., Toronto (CA)

(72) Inventors: Jun Ma, Markham (CA); Jianming Liu, Markham (CA); Lixin Shi, Mississauga (CA); Jianguo Feng, Mississauga (CA)

(73) Assignee: Rogers Communications Inc., Toronto, Ontario (CA)

( * ) Notice: Subject to any disclaimer, the term of this patent is extended or adjusted under 35 U.S.C. 154(b) by 872 days.

(21) Appl. No.: 14/022,334

(22) Filed: Sep. 10, 2013

(65) Prior Publication Data
US 2015/0074245 A1   Mar. 12, 2015

(51) Int. Cl.
G06F 15/16    (2006.01)
H04L 29/08    (2006.01)
(Continued)

(52) U.S. Cl.
CPC ............ *H04L 67/32* (2013.01); *H04L 41/082* (2013.01); *H04L 61/2521* (2013.01);
(Continued)

(58) Field of Classification Search
CPC . H04L 12/2834; H04L 41/08; H04L 41/0803; H04L 41/082; H04L 61/2521;
(Continued)

(56) References Cited

U.S. PATENT DOCUMENTS 7,646,775 B2    1/2010 Capone et al.
8,233,486 B2    7/2012 Phuah et al.
(Continued)

FOREIGN PATENT DOCUMENTS

WO    2013069927    5/2013

OTHER PUBLICATIONS

Stack Overflow Browser: "NAT traversal without an external server" retrieved on May 29, 2013.
(Continued)

*Primary Examiner* — Lance L Barry
(74) *Attorney, Agent, or Firm* — Rowand LLP

(57) ABSTRACT

Methods, devices and systems for facilitating a connection are described. In one aspect, a method for facilitating a connection between a public internet protocol (IP) address allocated remote management server (RMS) and private IP address allocated customer-premises equipment (CPE) devices that are serviced by a home gateway device (HGD) is described. The CPE devices are located within a different type of network than the RMS. The HGD implements the method which includes: receiving, from an operation support system, a request to download a service module stored on a storage server, the request including an identifier associated with a CPE device; in response to receiving the request, downloading the service module from the storage server; initiating the downloaded service module on the HGD; and in response to initiating the service module, instructing an identified CPE device based on the identifier to establish the connection with the RMS via the HGD.

16 Claims, 4 Drawing Sheets

(51) Int. Cl.
*H04L 12/24* (2006.01)
*H04L 29/12* (2006.01)

(52) U.S. Cl.
CPC ...... *H04L 61/2567* (2013.01); *H04L 61/2582* (2013.01); *H04L 67/02* (2013.01)

(58) Field of Classification Search
CPC . H04L 61/2567; H04L 61/2582; H04L 67/02; H04L 67/32; H04L 67/141
See application file for complete search history.

(56) References Cited

U.S. PATENT DOCUMENTS

| | | | |
|---|---|---|---|
| 2006/0120305 A1* | 6/2006 | Van Den Bosch | H04L 12/2803 370/254 |
| 2008/0133760 A1* | 6/2008 | Berkvens | H04L 61/2582 709/228 |
| 2008/0137673 A1* | 6/2008 | Phuah | H04L 12/66 370/401 |
| 2009/0125958 A1* | 5/2009 | Siripunkaw | H04L 12/2801 725/111 |
| 2010/0054266 A1* | 3/2010 | Bouchat | H04L 12/2809 370/401 |

OTHER PUBLICATIONS

Wikipedia: "Interactive Connectivity Establishment" retrieved on May 29, 2013.
Eyeball Networks Inc.: STUN, TURN, ICE for NAT Traversal retrieved on May 29, 2013.
Wikipedia: "TR-069" retrieved on May 29, 2013.
DSLHome-Technical Working Group: "Applying TR-069 to Remote Management of Home Networking Devices" dated Dec. 2005, TR-111.
Wikipedia: "Traversal Using Relays around NAT" retrieved on May 29, 2013.

* cited by examiner

HOME GATEWAY DEVICES AND METHODS FOR FACILITATING CONNECTIONS BETWEEN CUSTOMER PREMISES EQUIPMENT DEVICES AND SERVERS

TECHNICAL FIELD

The present disclosure relates generally to the remote management of devices across different networks. More specifically, it relates to methods and devices for facilitating a connection between devices across a public and private network.

BACKGROUND

Communication networks consist of various types of networks including at least Wide Area Networks (WANs) and Local Area Networks (LANs). A WAN is a network that covers a broad geographic area and which may link other networks, such as LANs. The WAN may include one or more "public networks". A public network may be a network that is operated by a service provider that provides subscribed services for devices. The public network may further include systems, servers and devices operated by the service provider that performs specific function and features when providing such services. The LAN may be referred to as a "private network", and may be a personal network of an end-user, an enterprise network, etc. The LAN similarly includes systems, servers and devices that may perform different functions and features.

Devices within different networks (such as, a WAN and LAN) may communicate with one another. More specifically, devices located within a LAN may connect to a gateway device that provides the interface to establish communication between devices across the WAN and LAN. The gateway device is a component that provides network switching and translation, modem connectivity and routing functionalities in order to connect across different networks. For example, as the devices within a LAN are allocated private internet protocol (IP) addresses, the gateway device provides network address translation (NAT) services in order that devices within the LAN may communicate with the devices within the WAN (which are allocated public internet protocol (IP) addresses).

In at least some examples, one or more devices within a LAN may be serviced by the service provider. That is, a user may be subscribed to the service provider so that the devices within the user's LAN may receive subscribed services. In such cases, the devices may be referred to as "customer-premises equipment" (CPE) devices. CPE devices may be managed by servers on the service provider's WAN network. For example, an Auto-Configuration Server (ACS) may provide configuration and control capabilities of these CPE devices. In order for the ACS to remotely manage these CPE devices, CPE WAN management protocol was established which defines an application layer protocol used for communication between these devices across the Internet.

However, under the current CPE WAN management protocol, the ACS cannot directly initiate communication with a CPE device (as the CPE device is allocated a private IP address). Instead, Session Traversal Utilities for NAT (STUN) servers are implemented within the service provider's network which provide NAT services for the CPE devices and allow for the ACS to initiate the communication via the STUN server. In such cases, the STUN server opens a port on the gateway device whose connection is kept open by the CPE device in order to monitor for an initiation of a communication from the ACS.

Unfortunately the use of STUN servers have a number of drawbacks including increase in costs, congestion within networks, and the potential of security risks to the networks.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

Figure 1:
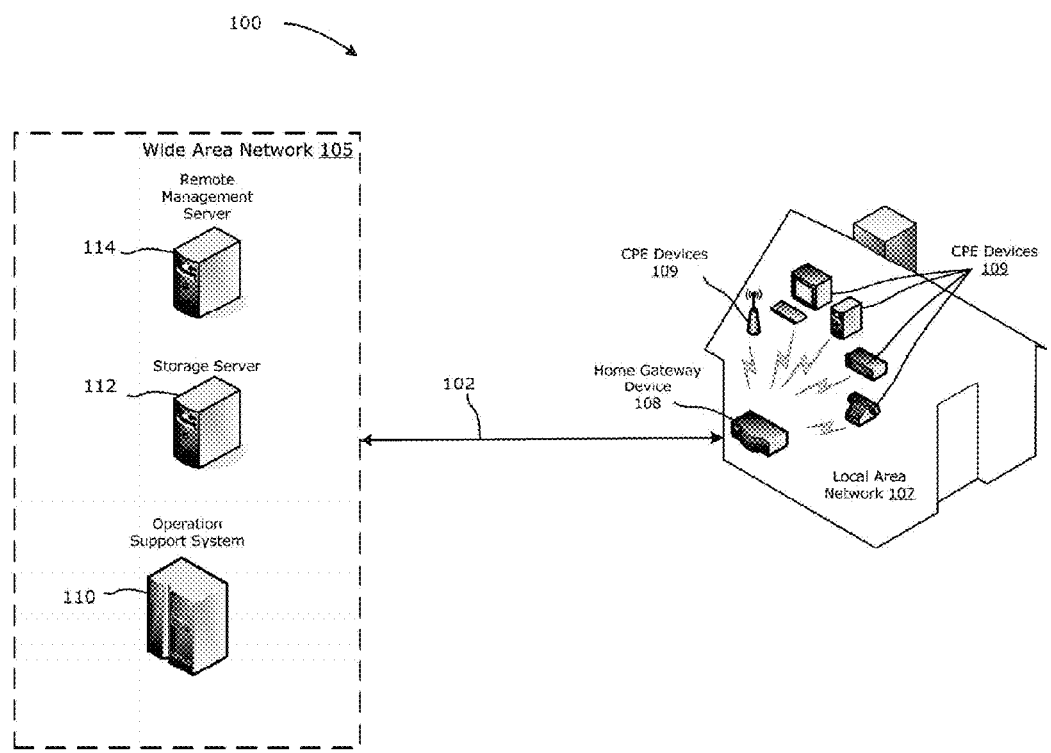
FIG. 1 shows a block diagram illustrating an example communication system in which example embodiments of the present disclosure may operate.

In one aspect, a method for facilitating a connection between a remote management server and one or more customer-premises equipment (CPE) devices is described. The method is implemented on a home gateway device. The one or more CPE devices are located within a local area network and serviced by the home gateway device. The one or more CPE devices are each allocated a private internet-protocol (IP) address. The remote management server is located within a wide area network and is allocated a public IP address. The method includes: receiving, from an operation support system, a request to download a service module stored on a storage server, the request including an identifier associated with one of the CPE devices; in response to receiving the request, downloading the service module from the storage server; initiating the downloaded service module on the home gateway device; and in response to initiating the service module, instructing an identified one of the CPE devices based on the identifier to establish the connection with the remote management server via the home gateway device.

In another aspect, a home gateway device is described. The home gateway device facilitates a connection between a remote management server and one or more customer-premises equipment (CPE) devices. The one or more CPE devices are located within a local area network and serviced by the home gateway device. The one or more CPE devices are each allocated a private internet-protocol (IP) address. The remote management server is located within a wide area network and is allocated a public IP address. The home gateway device includes a communication subsystem and a memory. The home gateway device also includes a processor coupled to the communication subsystem and the memory. The processor is configured to: receive, from an operation support system, a request to download a service module stored on a storage server, the request including an identifier associated with one of the CPE devices; in response to receiving the request, download the service module from the storage server; initiate the downloaded service module on the home gateway device; and in response to initiating the service module, instruct an identified one of the CPE devices based on the identifier to establish the connection with the remote management server via the home gateway device.

In yet another aspect, a method implemented by an operation support system is described. The method includes: receiving an instruction selecting a consumer premises equipment (CPE) device from one or more CPE devices that are located within a local area network and serviced by a home gateway device, with each CPE device being allocated a private internet-protocol (IP) address; retrieving, from memory, a media access control (MAC) address associated with the home gateway device; retrieving, from the memory, an identifier associated with the selected CPE device; sending a request, to a remote management server within a wide area network and being allocated a public IP address, for the public IP address of the home gateway device and the private IP address of the selected CPE device, the request includes the MAC address and the identifier; in response to sending the request, receiving the public IP address of the home gateway device and the private IP address of the selected CPE device from the remote management server; and sending a request to the home gateway device identified by the public IP address to download a service module stored on a storage server to enable a connection between one of the CPE devices identified by the private IP address, and the remote management server, the request including the private IP address of the identified CPE device.

In yet another aspect, an operation support system is described. The operation support system includes a communication subsystem and a memory. The operation support system also includes a processor coupled to the communication subsystem and the memory. The processor is configured to: receive an instruction selecting a consumer premises equipment (CPE) device from one or more CPE devices that are located within a local area network and serviced by a home gateway device, with each CPE device being allocated a private internet-protocol (IP) address; retrieve, from the memory, a media access control (MAC) address associated with the home gateway device; retrieve, from the memory, an identifier associated with the selected CPE device; send a request, to a remote management server within a wide area network and being allocated a public IP address, for the public IP address of the home gateway device and the private IP address of the selected CPE device, the request includes the MAC address and the identifier; in response to sending the request, receive the public IP address of the home gateway device and the private IP address of the selected CPE device from the remote management server; and send a request to the home gateway device identified by the public IP address to download a service module stored on a storage server to enable a connection between one of the CPE devices identified by the private IP address, and the remote management server, the request including the private IP address of the identified CPE device.

In yet another aspect, a non-transitory computer readable medium is described. The non-transitory computer readable medium includes instructions for performing a method described herein.

Other aspects and features of the present application will become apparent to those ordinarily skilled in the art upon review of the following description of specific embodiments of the application in conjunction with the accompanying figures.

Example Communication System

Reference is first made to FIG. 1, which illustrates in block diagram form a communication system 100 in which example embodiments of the present disclosure may operate.

In the embodiment of FIG. 1, different types of networks are shown in which systems, servers and devices may operate. The networks may include one or more of a wide area network (WAN) 105, a local area network (LAN) 107, a short-range communication network, other network arrangements, and/or a combination of these networks. As will be discussed below, the networks may be of various types providing different services to the systems, servers and devices operating within them.

In at least some example embodiments, the networks (such as, the WAN 105 and LAN 107) may include both wireless and wired networks. Wireless networks allow systems, servers and/or devices operating within them to communicate with one another wirelessly; while, wired networks allow these systems, servers and/or devices to communicate with one another over wired connections. In at least some example embodiments, such communications between these systems, servers and/or devices may occur wirelessly and/or over wired connections across different types of networks (e.g. communications between devices in a WAN 105 with devices in a LAN 107).

As mentioned above, in at least some example embodiments, the networks (such as the WAN 105 and/or LAN 107) may be configured to provide different types of services to the systems, servers and devices operating within them. For example, one or more of the networks may be configured to provide subscription-based services or other types of services to mobile communication devices (such as, smartphones, tablets, modems, computing devices, or mobile communication devices of another type). Such services may include voice and/or data communications services allowing these mobile communication devices to engage in voice-based and/or data-based communications with other devices, systems and/or servers.

In at least some example embodiments, one or more networks (such as the WAN 105 and/or the LAN 107) are configured to deliver content to subscribers. In such example embodiments, the one or more networks may include a content delivery system which is configured to deliver content from a content source system to a content destination system. The content delivery system, for example, may be a broadcast television system which delivers television content such as broadcast television programs. These one or more networks may, in some embodiments, support an Internet service provider (ISP) to allow a plurality of subscribers connected to the one or more networks to access the Internet. For example, a modem associated with a subscriber may be used to send and receive data packets to online servers or systems. In some embodiments, the ISP provided system may be a cable Internet system which is configured to provide broadband Internet access over a cable television infrastructure. In some embodiments, the one or more networks may be configured to provide telephone services. That is, the one or more networks may provide telephone services to a plurality of subscribers connected to the one or more networks. The telephone services may, in some embodiments, be voice over internet protocol (VOIP) services, which may be provided over cable network infrastructure, for example. In at least some example embodiments, the one or more networks may provide a plurality of subscription based services. For example, the one or more networks may provide any combination of Internet, telephone, television, or other services.

The services delivered on these one or more networks may be delivered wirelessly and/or over wired transport mediums. For example, in the case of wireless delivery, services may be broadcasted as radio frequency signals from a service provider's system (such as, a terrestrial based broadcaster) for receipt, via one or more antennas, at a subscriber's system. In the case of wired delivery, the services may be transported over wired mediums such as coaxial cable, fibre optic cable and/or twisted pair cable. Moreover, other forms of delivery systems may be implemented to transport the services not specifically described herein.

As illustrated, the one or more networks may include a LAN 107. The LAN 107 is a localized network over a small area that provides for interconnection of devices residing within the LAN 107. The LAN 107 may include a system via which services are provided to subscribers. In the example illustrated, the system may include a home gateway device 108 (which is also referred to as a "residential gateway"). The home gateway device 108 is defined as a network node that allows networks of different types to communicate with one another. More specifically, the home gateway device 108 is a network node located in a network (e.g. the LAN 107) to facilitate communications between the network and other networks (e.g. the WAN 105) of different communication protocols. The home gateway device 108 acts as an intermediary device to relay content and communications between systems and servers on a service provider's network (i.e. within the WAN 105), and customer-premises equipment (CPE) devices 109 in a home network (i.e. within the LAN 107). More specifically, the home gateway device 108 allows a connection of a LAN 107 (which is shown as a home network of a house) with a WAN 105 (which is shown as a service provider's network) via an access link which is illustrated as 102 (the access link 102 forms a wireless and/or wired communication link between the WAN 105 and the LAN 107). The home gateway device 108 is located within the LAN 107, and services the CPE devices 109 in the LAN 107. That is, the home gateway device 108 delivers subscribed services from the service provider's systems to the CPE devices 109. The home gateway device 108 may also form a link for communication between the service provider's systems and the CPE devices 109. The home gateway device 108 is equipped with the hardware and software components to perform these functions. For example, the home gateway device 108 may include modem, routing, network translation and switching, etc. capabilities so that data signals may be relayed between devices within the WAN 105 and the LAN 107. Additionally, the home gateway device 108 includes interfaces to connect to wired or wireless transport mediums via which the data signals are transmitted. As such, the home gateway device 108 is a centralized device that is capable of managing various types of CPE devices 109 to receive subscribed services. Examples of home gateway devices include the Internet Home Gateway (iHG) by Cisco™, the EVOLO system by Broadband Gateway™, etc.

In at least some example embodiments, the home gateway device 108 may additionally include features and functions of a router. A router is a device that is capable of sending and receiving data packets between networks and devices. For example, the router may receive data packets from one network or device, and route the data packets to a destination network or device. Accordingly, such "traffic directing" functions of a router may be included within the home gateway device 108. In such example embodiments, the home gateway device 108 may serve dual purposes in interconnecting networks of different communication protocols as well as routing communications between these networks, and other networks and devices. In at least some example embodiments, the home gateway device 108 may not include the features and functions of a router (e.g. the home gateway device 108 does not include a built-in router). Rather, the home gateway device 108 and the router may be separate components located within a network (e.g. a LAN), and capable of performing their respective functions.

In at least some example embodiments, the communication system 100 may be configured to provide content delivery services to subscribers. For example, a server or a head-end system located within the WAN 105 or another network (such as, a private network) may deliver content to devices within the LAN 107 via the access link 102. In some embodiments, the communication system 100 (for example, the server or head-end system) may be configured to deliver television programming. In such example embodiments, the home gateway device 108 may receive and route content (that is transmitted from devices on the service provider's network) to one or more CPE devices 109, such as a receiver. A receiver may be connected to a media player, such as a television, on which content received at the receiver may be displayed. In at least some example embodiments, the receiver, or parts thereof, may be internal to a media player (e.g. the television). For example, a receiver may be a component of a television which is included in the television at the time of manufacture. In other embodiments, a receiver may be an external receiver which is connected to the media player (e.g. the television) through a wired or wireless transport medium.

One or more of the receivers which are serviced by the home gateway device 108 may, in at least some example embodiments, be a set top box. A set top box is a device which connects to a television (or other display) and an external source of signal, converting the signal into a format, such as component video or HDMI signals which may be displayed on the television (or other display). The term set top box includes devices which do not, necessarily, sit on top of a television. That is, the term set top box may refer to any device which is external to a television (or other display) and which receives an external signal, converts the signal into a different format suitable for the display device. The receivers may also take other forms including, for example, a gaming console, a cable card, a personal computer, a tablet device, a smartphone, etc. The receivers may be any device at which content, via the home gateway device 108, may be received.

In at least some example embodiments, the communication system 100 (for example, the server or head end system) may be configured to provide Internet services to subscribers. In such example embodiments, the home gateway device 108 may be configured to receive and route such Internet services to one or more CPE devices 109. More particularly, the home gateway device 108 may connect to the Internet and may include or be associated with subsystems (such as, a router, cable or DSL modem, etc.) which may be useful for providing Internet services to the CPE devices 109. The CPE devices 109 may include any device that is capable of receiving internet services such as a desktop computer, a laptop, a tablet, a television, etc.

In at least some example embodiments, the communication system 100 (for example, the server or head end system which may be located within the WAN 105) may be configured to provide telephone services to subscribers. Accordingly, the home gateway device 108 may be configured to support such telephone services. For example, the home gateway device 108 may be connected to the public switched telephone network (PSTN) to deliver telephone services to one or more CPE devices 109, such as a telephone. In at least some example embodiments, the home gateway device 108 provides VOIP telephone services to a telephone configured to receive such services.

In at least some example embodiments, other types of services may be delivered via the home gateway device 108 to the CPE devices 109. Additionally, the CPE devices 109 within the LAN 107 may be of other types such as a femtocell, a storage device, etc. that are enabled to receive the appropriate services from the home gateway device 108. As different services may be delivered to different types of CPE devices 109, the home gateway device 108 is configured to route content associated with specific services to appropriate CPE devices 109. For example, the home gateway device 108 may route television services to a receiver connected to a television, route telephone services to a telephone, etc.

The home gateway device 108 may be owned by the service provider, and provided to a subscriber for delivery of subscribed services to one or more CPE devices 109. Similarly, in at least some example embodiments, one or more CPE devices 109 may also be owned by the service provider, and provided to the subscriber to receive the subscribed services. In at least some example embodiments, one or more CPE devices may be owned by the subscriber. As such, the use of the term customer premises equipment does not necessary mean ownership of the equipment by the customer. Rather, the customer premises equipment device is hardware and associated computer software that is associated with a subscriber's location and which is located in the subscriber's premises and connected to the home gateway device 108.

Moreover, although the CPE devices 109 are illustrated to be residing within a LAN 107 that is a home network of a subscriber's house, it will be appreciated that the CPE devices 109 may reside in other types of LANs. For example, the LAN may be a private network owned and operated by an enterprise, a corporation, an organization, etc.

Additionally, devices within a LAN 107, such as the CPE devices 109, are each allocated a private internet protocol (IP) address to identify the devices within the LAN 107. A private IP address is an address that is not globally delegated (i.e. it is not available publicly), and these devices cannot communicate directly with devices in other networks. Rather, a network address translator (NAT) system (which may be implemented within the home gateway device 108) may be used via which the CPE devices 109 may communicate with the devices in other networks. The NAT system modifies the private IP address information included in communications from a CPE device 109, to a public internet protocol (IP) address in order that the CPE device 109 may communicate with other networks. More specifically, the home gateway device 108 is allocated a public IP address, and the CPE device 109 may communicate across other networks through the home gateway device's 108 public IP address.

As illustrated, systems, servers and devices within different networks may connect and communicate with one another via an access link 102. The access link 102 may be a wired and/or wireless communications link allowing for communication to occur between devices across different networks. More particularly, the access link 102 may connect devices within the WAN 105 with devices with the LAN 107 in order that these devices may communicate with each other. In at least some example embodiments, servers within the WAN 105 may communicate with one or more CPE devices 109 within the LAN 107 via the home gateway device 108, over the access link 102.

As illustrated, the communication system 100 may also include a WAN 105. The WAN 105 is a network that covers a broad geographic area and which may link other networks, such as LANs 107. The WAN may include the internet and/or one or more public networks. A public network may be a network established and operated by a service provider for providing subscribed services. As mentioned above, the subscribed services may include content service (e.g. television service), telephone service and/or internet service that are delivered to a subscriber's home network (i.e. the LAN 107). The service provider may also own or control some or all of the elements necessary to deliver these services. For example, the service provider may own or control the network infrastructure which may include systems, servers and devices within the WAN 105 (or other networks, such as a head-end system located within a different network) that provide the management and transmission of these services. Such a service provider may be referred to as a "Multi-System Operator" (MSO), and examples of such a service provider may include Rogers Communications™, Time Warner™, Virgin Media™, etc.

As illustrated, the WAN 105 includes an operation support system (OSS) 110. The OSS 110 may include one or more systems that provide management services of networks (such as, networks within the WAN 105). The management services may include maintaining network topologies and inventories, provisioning services on the networks, configuring network components and managing faults. The OSS may further include or be associated with business support systems (BSS) that manage subscription services for subscribers. Such services may include managing subscription services, processing bills and collecting payments from subscribers. Additionally, the OSS 110 may include or be associated with a call centre which is a centralized office used for the purpose of receiving or transmitting requests by telephone. The call centre may be used to process incoming support and/or information inquiries from customers, as well as to perform outbound solicitation, debt collection, and market research tasks. The call centre is operated by call centre agents who document relevant information that is inputted into a system that manages and processes this information. Furthermore, the OSS 110 may include or be associated with a web server that performs the typical functions of a web server in hosting and/or delivering web content that can be accessed by other devices via the Internet.

When a customer purchases subscription services from a service provider, the customer is subscribed to the service provider. The service provider, and more specifically the OSS 110, may maintain and/or have access to information associated with the customer to define a profile for the customer. For example, the information may include personal information (such as, a name, address, email address, etc.) of the subscriber. The information may also include information associated with devices (which may be referred to as "device information") that are used by the subscriber. As mentioned above, the service provider may own some or all of the devices that are issued to a subscriber in order for subscribed services to be received. For example, the service provider may own and issue the home gateway device 108, and one or more CPE devices 109 such as a receiver. In such example embodiments, a unique identifier associated with each of the devices that are issued to a subscriber may be maintained as part of the device information. Similarly, identifiers associated with devices that are not issued by the service provider, but which are owned by the subscriber and which may receive subscription services, may also be maintained as part of the device information. In at least some example embodiments, the identifier may be a media access control (MAC) address of a device which is a unique serial identifier assigned to devices that connect to networks.

The WAN 105 also includes one or more storage servers 112. The storage servers may store different types of applications, modules and information associated with the management of subscription services. In at least some example embodiments, a storage server 112 may be configured to store a specific type of application that performs a desired function. For example, the storage server 112 may store a service module. The service module is an application which, when downloaded and executed by the home gateway device 108, facilitates a connection between devices across a public network (such as, the WAN 105) and a private network (such as, the LAN 107). More specifically, when the service module is initiated on the home gateway device 108, the home gateway device 108 enables a connection between one or more public internet protocol (IP) servers (such as, a remote management server 114) with one or more private internet protocol (IP) devices (such as, one or more CPE devices 109). It will also be appreciated that the same service module, when downloaded and initiated, may enable the home gateway device 108 to establish a connection between different types of CPE devices 109 and the remote management server 114. That is, the service module remains unchanged and is compatible for many types of CPE devices 109. Such functionalities of the service module are provided in greater detail below.

Additionally, in at least some example embodiments, the storage server 112 that stores the service module may be a web server. The web server may store web based content, which includes the service module, that may be accessed via the Internet. In such example embodiments, devices (such as, the home gateway device 108) that are enabled with web service capabilities or a web browser may connect with the web server in order to download the application. For example, such devices may send a hypertext transfer protocol (HTTP) connection request over the Internet to the associated web address that points to the location of the service module on the web server, and in response, receive the service module from the web server.

The WAN further includes a remote management server 114. The remote management server 114 is a server that is configured to remotely manage devices, such as CPE devices 109 that reside within a LAN 107 (i.e. a different and private network). The remote management server 114 may provision, update, repair, etc. the CPE devices 109 in order that the CPE devices 109 are properly enabled to receive subscription services. In order to perform such functionalities, requisite communications are sent between the remote management server 114 and the CPE devices 109. However, as the remote management server 114 is allocated a public IP address within a public network, and the CPE devices 109 are allocated private IP addresses within a private network, communication may not occur directly between them. Instead, communication between them occurs via the home gateway device 108 (which is allocated a public IP address).

Furthermore, in such example embodiments, a CPE device 109 may initiate the communication (e.g. send a connection request) with the remote management server 114, via the home gateway device 108, and in response, two-way communication may occur between them. In such cases, the CPE device 109 may identify the remote management server 114 by its public IP address for connection. On the other hand, the remote management server 114 may not be able to initiate the communication with a particular CPE device 109, via the home gateway device 108, as the remote management server 114 may not be able to identify the particular CPE device 109 for connection (as the CPE device 109 is allocated a private IP address). In order for such a connection to occur, in at least some example embodiments, the home gateway device 108 may need to be provisioned. More specifically, the home gateway device 108 may execute one or more applications (i.e. a service module) enabling communications to occur between the remote management server 114 and a CPE device 109 when communication is requested to be initiated with the remote management server 114.

In such example embodiments, systems and servers on a service provider side (i.e. within the WAN 105) may cooperate and coordinate with devices on a subscriber side (i.e. within the LAN 107) in order to initiate such communication between the remote management server 114 and a CPE device 109. For example, the OSS 110 may receive an initial instruction selecting a particular CPE device within a subscriber's network. The selected CPE device is a device identified by the service provider that needs to be configured by the remote management server 114. As mentioned above, the OSS 110 may store in memory identifiers (such as MAC addresses) associated with the home gateway device 108 and CPE devices of each subscriber. Accordingly, the OSS 110 may retrieve, from memory, the identifier associated with the home gateway device 108 that services the selected CPE device, and the identifier of the selected CPE device. The OSS 110 then sends a request to the remote management server 114 for the internet protocol (IP) addresses of the home gateway device 108 and the CPE device 109 with the request including the retrieved identifiers. As will be discussed in greater detail below, the remote management server 114 stores, in a database within a memory, the IP addresses of the home gateway device 108 and CPE devices 109 for each subscriber. In such cases, the IP address of each device (i.e. of the home gateway device 108 and the CPE devices 109) may be stored in association with a corresponding identifier for the device. The remote management server 114 retrieves, from memory, the associated IP addresses corresponding to the received identifiers (by, for example, comparing the received identifiers with the stored identifiers, and retrieving the IP addresses of the devices associated with the stored identifiers that match the received identifiers), and sends these IP addresses to the OSS 110. After receiving the IP addresses, the OSS 110 sends a request to the home gateway device 108 (which is identified by one of the received IP address) to download the service module stored on the storage server 112. The request also includes the IP address of the selected CPE device so that the home gateway device 108 is informed of the CPE device for which connection is to be established. In response to receiving the request, the home gateway device 108 downloads the service module from the storage server 112, and executes the downloaded service module (i.e. the home gateway device 108 is being provisioned). In response to such execution, the home gateway device 108 sends an instruction to the selected CPE device (which is identified by its received IP address) to establish a connection with the remote management server 114 via the home gateway device 108.

Communication may now be established between the selected CPE device and the remote management server 114. In at least some example embodiments, the communication is under the internet protocol suite. That is, a layered Transmission Control Protocol (TCP)/Internal Protocol (IP) connection is established over which communication occurs between the device and the server. More specifically, the TCP/IP connection is an application layer connection which is a process-to-process communication across IP networks, and which includes the web-based HTTP connection. Moreover, the application layer connection may be a Customer-Premises Equipment Wide Area Network Management Protocol (CWMP) connection which is a standardized protocol for remote management of subscriber devices. More particularly, it is an HTTP-based protocol for communication between CPE devices 109 and a remote management server 114 that is an auto-configuration server (ACS). An ACS is enabled to automatically provision and remotely manage CPE devices under the CWMP protocol. Such communication under the CWMP protocol is defined under Technical Report 069 (created by the Broadband Forum) which provides specifications in carrying out such communications. Accordingly, communication between the selected CPE device and the remote management server 114 (which is an ACS) may occur under the CWMP protocol. Greater details of communication under the CWMP protocol are provided below.

Additionally, in at least some example embodiments, the home gateway device 108 may receive confirmation of receipt of the instruction (that was sent from the home gateway device 108 to the selected CPE device) from the selected CPE device, and in response to receiving this confirmation, terminate the executed service module on the home gateway device 108. As such, the home gateway device 108 no longer needs to continue to run the service module, while communication occurs between the selected CPE device and the remote management server 114 via the home gateway device 108.

Moreover, as part of the connection between the selected CPE device and the remote management server 114, the selected CPE device may send a notification that is relayed to the remote management server 114 from the home gateway device 108, indicating initiation of the connection. That is, the CPE device 109 informs the remote management server 114 of the initiation of the connection. Two-way communication may then occur between the selected CPE device and the remote management server 114. When communication ends between them, the remote management server 114 may send an instruction to the selected CPE device to end the connection via the home gateway device 108. Upon receipt of the instruction, the selected CPE device terminates the connection between itself and the remote management server 114. As such, the termination process is initiated by the remote management server 114, and executed by the selected CPE device.

Accordingly, by provisioning the home gateway device 108 in such a manner, systems and servers on the service provider side (i.e. within the WAN 105) may initiate connection with devices on the subscriber side (i.e. within the LAN 107), in order to remotely manage these devices. Moreover, the home gateway device 108 allows for a specific device to be selected for management.

Example components and features of the home gateway device 108, the OSS 110 and the remote management server 114 will be discussed in greater detail below with reference to FIGS. 2 and 3.

It will also be appreciated that the above-described communication system 100 is provided for the purpose of illustration only, and that the above-described communication system 100 includes one possible communication network configuration of a multitude of possible configurations.

For example, while the OSS 110 is illustrated as a single component, in practice it may be constructed of a number of components which may be physically separated from one another. Additionally, in at least some example embodiments, the storage server 112 or the remote management server 114 may be implemented within the OSS 110.

Example Home Gateway Device

Figure 2:
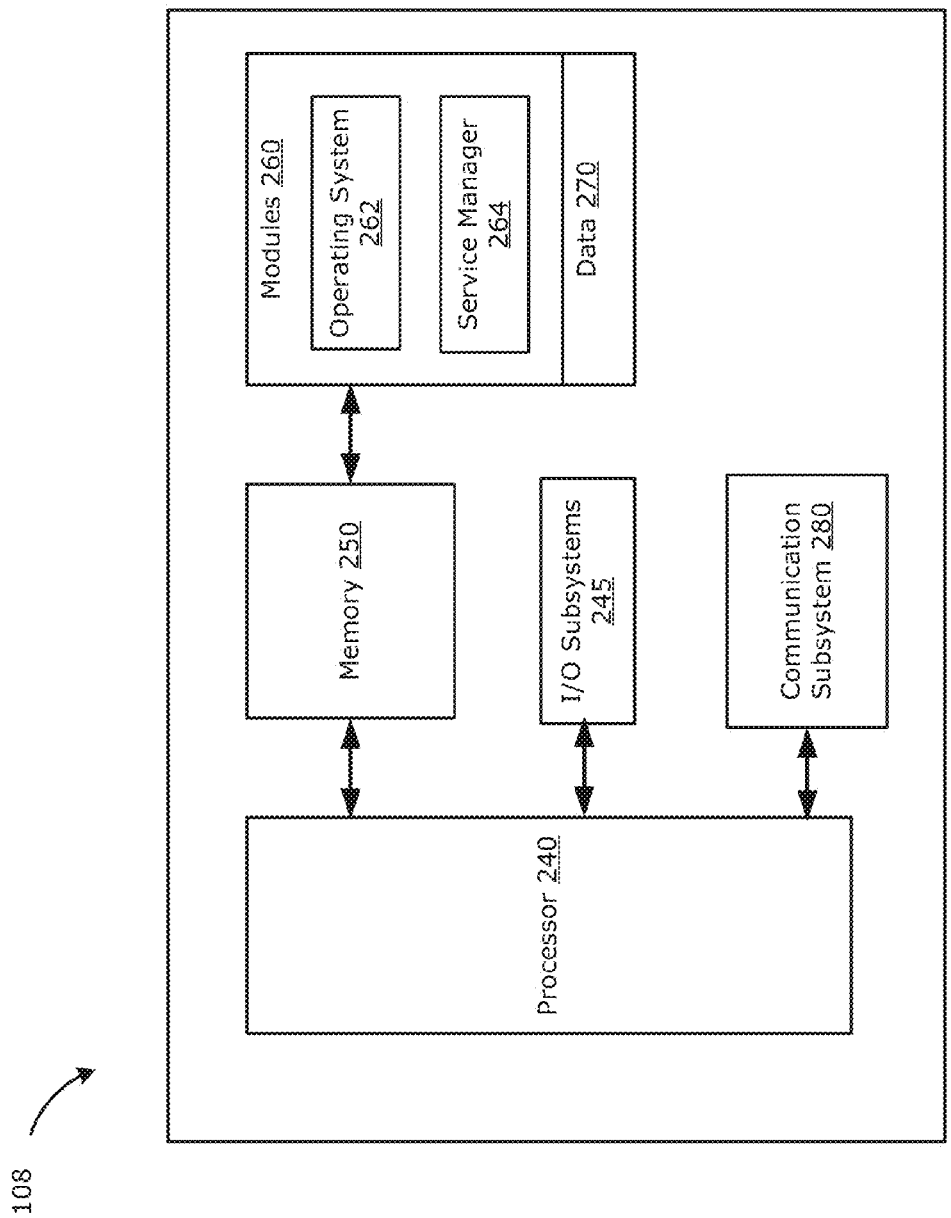
FIG. 2 shows a block diagram of an example home gateway device in accordance with example embodiments of the present disclosure.

Reference is next made to FIG. 2 which illustrates an example home gateway device 108 in block diagram form. Although the home gateway device 108 is shown to be implemented as a single device, it will be understood that the functions of the home gateway device 108 may be implemented across a multitude of devices, or other suitable architecture.

The home gateway device includes a controller which may include one or more processors 240 that control the overall operation of the home gateway device 108. The processor 240 may be communicably coupled with device subsystems including input/output (I/O) subsystems 245, memory 250 (which may include multiple memory components of various types such as flash memory, random access memory (RAM), read only memory (ROM), a hard disk drive (HDD), a solid state drive (SSD), or other types of memory), communication subsystems 280 for communicating either wirelessly or non-wirelessly with other systems, servers and/or devices. The processor 240 may be communicably coupled with other device subsystems not specifically described herein.

In at least some example embodiments, the I/O subsystems 245 include external communication ports and/or interfaces to form various types of connections. For example, wired or wireless transport mediums may be used to deliver content and communications between devices that are relayed via the home gateway device 108. In at least some example embodiments, subscribed services (such as, television, internet, telephone, etc.) may be delivered via different types of cables, and the I/O subsystems 245 ports and/or interfaces may be used to connect to these cables to receive these services. Similarly, CPE devices may be connected to the I/O subsystems 245 ports and/or interfaces to receive and send content and communications via the home gateway device 108. In at least some example embodiments, subscribed services may be delivered wirelessly (e.g. via 3G connections, 4G connections, Wi-Fi, etc.). In such example embodiments, the home gateway device 108 may include I/O subsystems 245 interfaces that are configured to receive services wirelessly. Similarly, CPE devices 109 may be connected to the I/O subsystems 245 interfaces to wirelessly receive and send content and communications via the home gateway device 108.

The communication subsystem 280 performs communication functions to connect the home gateway device 108 to other systems, servers and devices. In at least some example embodiments, the communication subsystem 280 forms a communication link between service provider side devices and subscriber side devices, via the access link 102. That is, the communication subsystem 280 may relay content and communications between devices within the home network (for example, within the LAN 107) and devices outside the home network (for example, within the WAN 105) via the access link 102. Additionally, in at least some example embodiments, the I/O subsystems 245 may be implemented as part of the communication subsystem 280. As such, the communication subsystem may perform the functions and features of the I/O subsystem 245 (for example, the communication subsystem 280 may include connection ports and/or interfaces to form connections with wired and/or wireless transport mediums to receive and send content and communications).

As mentioned above, different types of subscribed services are received by the home gateway device 108 for distribution to various CPE devices 109. Accordingly, the home gateway device 108 is equipped or associated with hardware and software components to perform such distribution of services. For example, in at least some example embodiments, the home gateway device 108 may include routing capabilities to appropriately relay the data signals of the subscribed services. The home gateway device 108 may further include network switching capabilities that may assist in the routing functions. Additionally, a digital subscriber line (DSL) or cable modem may be included which is used to send and receive data relating to internet services between the CPE devices 109 and the internet and/or the WAN 105.

As also mentioned above, the CPE devices 109 within the subscriber's network are allocated private IP addresses while some of the devices, such as the remote management server 114, within the service provider's network are allocated public IP addresses. In such cases, communication between the CPE devices and for example, the remote management server 114 occurs via the home gateway device 108. In at least some example embodiments, the home gateway device 108 may include Network Address Translation (NAT) capabilities to translate the private IP addresses of the CPE devices in order to at least allow for data communications to be sent from these CPE devices to the remote management server 114.

It will be appreciated that the home gateway device 108 may include or be associated with other components not specifically described herein.

The home gateway device 108 may store data 270 in a data area of the memory 250. The data 270 may be of various types and may include service data, application data, one or more web addresses, etc. The data 270 may be organized, at least partially, into a number of databases or data stores each containing data items of the same data type. For example, a web address (such as, the web address defining the storage location of the service module) may be stored in a specific data store.

The processor 240 may operate under stored program control and may execute software modules 260 stored on the memory 250. The software modules 260 may be comprised of, for example, operating system software 262, and one or more additional modules such as a service manager 264 to carry out specific functions of the home gateway device 108.

In at least some example embodiments, the service manager 264 may be configured for web service communication. That is, the service manager 264 may be enabled for communication over the Internet based on Simple Object Access Protocol (SOAP) which includes communication based on HTTP requests and other Internet-related standards.

In at least some example embodiments, the service manager 264 may assist the service provider in identifying a particular CPE device from a plurality of CPE devices within a subscriber network for management by the remote management server 114. More specifically, the service manager 264 may facilitate a connection (initiated by the service provider) between the identified private IP allocated CPE device 109 and the public IP allocated remote management server 114 in order for the CPE device 109 to be remotely managed. In such example embodiments, upon identifying a particular CPE device 109 within a subscriber network for management by the service provider (and more specifically, by the OSS 110), the home gateway device 108 may receive, from the OSS 110, a request to download the service module stored on the storage server 112. The request including an identifier associated with one of the CPE devices. That is, the request is a command to the home gateway device 108 to download the service module, and additionally, the home gateway device 108 is informed of the CPE device which is selected to be managed by its identifier (such as, its private IP address).

As mentioned above, in at least some example embodiments, the service manager 264 may be enabled for HTTP communication which may be received via the communication subsystem 280 (and the I/O subsystems 245). In such cases, the request may be an HTTP request that includes the public IP address of the home gateway device 108, the private IP address of the identified CPE device and/or at least one parameter (such an HTTP request may be sent from a web server associated with the OSS 110). The inclusion of the public IP address is used to identify the location of the home gateway device 108 servicing the identified CPE device, for sending the request to. The inclusion of the private IP address is used to identify the particular CPE device that is requested to be managed (i.e. for which a connection needs to be established with the remote management server 114). The inclusion of the parameter (which is a value or data) is to act as a trigger to initiate downloading of the service module. For example, the request may be in the form of:

http://x.x.x.x/ISP/service/
?action=connectionrequest&cpeip=192.168.0.101.

The "x.x.x.x" defines the public IP address of the home gateway device 108; the "192.168.0.101" defines the private IP address of the identified CPE device; and the "action" and "cpeip" define the parameters.

In response to receiving the request, the service manager 264 downloads the service module from the storage server 112 using the communication subsystem 280. That is the service manager 264 requests and receives the service module from the storage server 112. In at least some example embodiments, as the service manager 264 may be enabled for HTTP communication, the service manager 264 may retrieve, from memory, the web address that includes the IP address of the storage server (i.e. the web address defining the location of the service module), and send an HTTP request to the web address to download the service module. For example, the HTTP request to the web address may be in the form of:

http://ispmodules.rogers.com/service/connectionrequest.

The web address identifies the service provider (e.g. "rogers") that owns or operates the storage server 112 that stores the service module.

As mentioned above, the service module is software that provisions the home gateway device 108 for establishing a connection between a CPE device 109 and the remote management server 114. Such software is compatible for causing the home gateway device 108 to establish a connection between a plurality of types of CPE devices 109 and the remote management server 114. That is, the same software may be downloaded to establish the connection regardless of the types of CPE devices 109. For example, the same software may be downloaded for establishing connection with a receiver (e.g. a set-top box), a VOIP phone, a server, a femtocell, etc.

The service manager 264 then initiates the downloaded service module on the home gateway device 108. That is, the service module is executed and running on the home gateway device 108.

In response to initiating the service module, the service manager 264 instructs an identified one of the CPE devices based on the received identifier to establish the connection with the remote management server 114 via the home gateway device 108. For example, the CPE device for which the received private IP address corresponds to, is instructed to establish the connection for management by the remote management server 114. The instruction may be provided via the I/O subsystems 245.

The identified CPE device then establishes the connection, and communication may occur between the identified CPE device and the remote management server 114 via the home gateway device 108. In at least some example embodiments, one or more of the CPE devices, including the identified CPE device, may store the public IP address of the remote management server 114; thus, enabling the identified CPE device to identify the remote management server 114 to which the connection is to be established.

In at least some example embodiments, the service manager 264 may receive confirmation, from the identified CPE device, of receipt of the instruction to establish the connection. In response to receiving such confirmation, the service manager 264 terminates the initiated service module on the home gateway device 108. Accordingly, once the service module performs its function of provisioning the home gateway device 108 to initiate the connection between the identified CPE device and the remote management server 114, the running of the service module on the home gateway device 108 may be ended. As such, the service module functionalities are no longer needed for the communication process between the identified CPE device and the remote management server 114.

Additionally, in at least some example embodiments, after the service manager 264 sends the instruction to establish the connection to the identified CPE device, the service manager 264 may receive from the identified CPE device and send to the remote management server 114 (i.e. relay) a notification indicating initiation of the connection. The notification informs the remote management server 114 of commencement of the connection. Communication relating to the management of the identified CPE device may then occur between the remote management server 114 and the identified CPE device. Upon ending of communication between the remote management server 114 and the identified CPE device, the service manager 264 may receive and send (i.e. relay) an instruction from the remote management server 114 to the identified CPE device for termination of the connection. When the identified CPE device receives the instruction, the identified CPE device terminates the connection, and communication may no longer occur between the identified CPE device and the remote management server 114 (unless the connection is similarly re-initiated).

As mentioned above, in at least some example embodiments the connection between the identified CPE device and the remote management server 114 may be a layered TCP/IP connection. More particularly, the TCP/IP connection may be a CWMP application layer connection (i.e. an HTTP based connection defined under the TR-069 specification or variations thereof). In which case, the remote management server functions as an ACS for communicating with the identified CPE device. In such example embodiments, for example, if a CWMP connection is established, the communication may be as follows (which occurs via the home gateway device 108): the identified CPE device may send an inform message indicating initiation of the connection to the ACS, and in response, receive an inform response message from the ACS indicating readiness for communication. HTTP requests may then be sent, and HTTP responses replying to these sent HTTP requests may subsequently be received between the identified CPE device and the ACS. Whenever either the CPE device or the ACS no longer needs to send any more HTTP requests to one another, an empty HTTP request is sent which signifies the end of sending requests by one of the devices. It will be appreciated that the described CWMP communication is one of a number of possible ways of communication as understood by a person skilled in the art.

In at least some example embodiments, other modules, such as the operating system 262 may perform some or all of the functions of the service manager 264. In at least some example embodiments, the service manager 264 may instead include a plurality of software modules rather than a single block as illustrated.

It will also be appreciated that the home gateway device 108 as illustrated in FIG. 2 is an example home gateway device. In at least some example embodiments, home gateway devices may be used which have different configurations and/or functions.

Example Operation Support System

Figure 3:
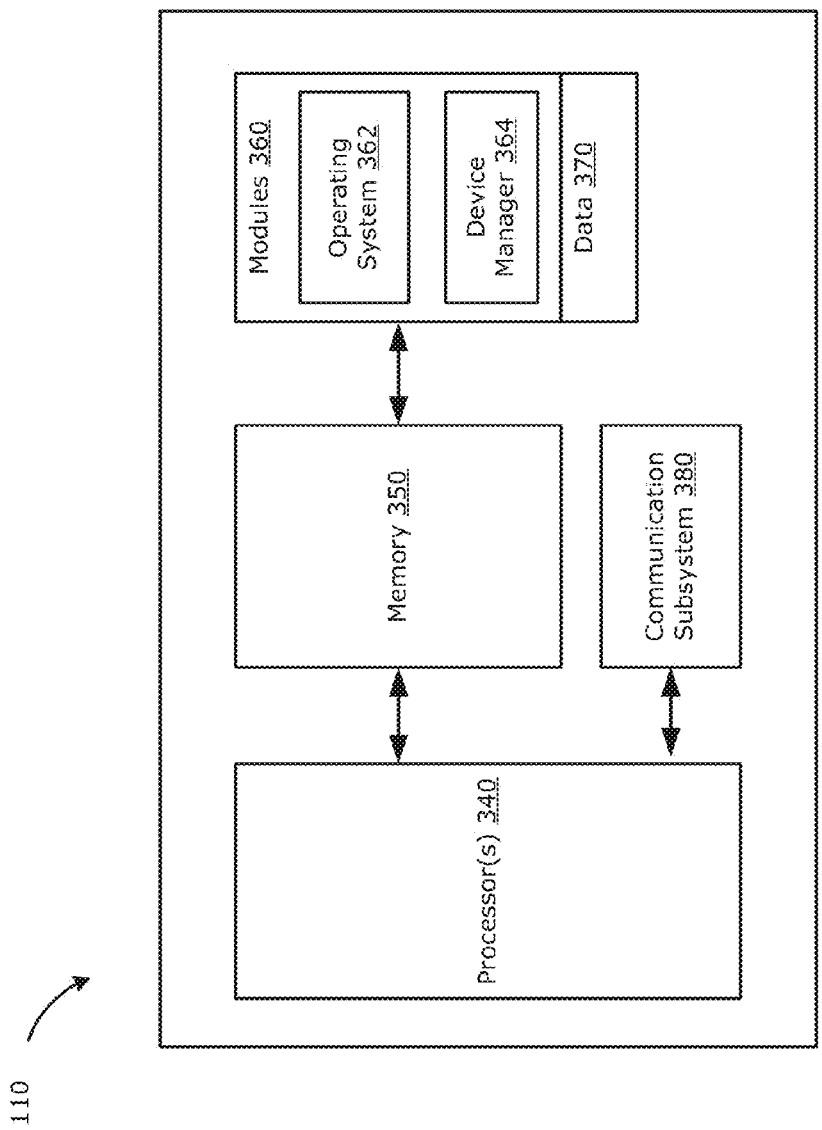
FIG. 3 shows a block diagram of an example operation support system in accordance with example embodiments of the present disclosure.

Reference is next made to FIG. 3 which illustrates an example operation support system (OSS) 110 in block diagram form. Although, the OSS 110 is shown to be implemented as a single system, as described above, the OSS 110 may include a multitude of systems, servers and/or devices that perform various functions. More specifically, the illustrated OSS 110 is a system that performs at least some of the coordinating functions and features for management of devices and networks.

In at least some example embodiments, the functions of the OSS 110 may be implemented, in whole or in part, by way of a processor 340 which is configured to execute software modules 360 stored in memory 350. In the embodiment of FIG. 3, the OSS 110 includes a controller comprising one or more processors 340 which control the overall operation of the OSS 110. The processor 340 interacts with one or more communication subsystems 380 to perform communication functions within the WAN 105 or via the access link 102, with other systems, servers and/or devices. More particularly, the communication subsystem 380 allows the OSS 110 to communicate with the remote management server 114 within the WAN 105, and the home gateway device 108 within the LAN 107 via the access link 102.

The OSS 110 also includes memory 350 which is connected to the processor 340 for receiving and sending data to the processor 340. While the memory 350 is illustrated as a single component, it will typically be comprised of multiple memory components of various types. For example, the memory 350 may include Random Access Memory (RAM), Read Only Memory (ROM), a Hard Disk Drive (HDD), Flash Memory, or other types of memory. It will be appreciated that each of the various memory types will be best suited for different purposes and applications.

The OSS 110 may store data 370 in a data area of the memory 350. The data 370 may be of various types and may include service data, application data, subscriber profile data, etc. The data 370 may be organized, at least partially, into a number of databases or data stores each containing data items of the same data type. For example, subscriber profile data may be stored in the same database and arranged accordingly within the database.

The subscriber profile data may be obtained and stored within the data 370 area when an end-user is subscribed to the service provider that owns or operates the OSS 110. The subscriber profile data defines information associated with a particular end-user (i.e. a subscriber). This information may be obtained from the end-user and/or automatically obtained by the OSS 110. As mentioned above, the information may include personal information of the end-user, and device information which is information associated with devices (such as, the CPE devices 109) being utilized by the end-user within the home network (i.e. the LAN 107).

Personal information may include personal identifying information of the end-user such as a name, date of birth, address, email address, alternate phone, etc. Such personal information is obtained when the end-user purchases subscription services from the service provider. In such cases, the service provider directly collects the information from the end-user at the time of purchase of the subscription services.

The device information includes identifiers associated with devices within the end-user's home network. For example, the device information may include the MAC addresses of the home gateway device 108 and/or the CPE devices within the LAN 107. In at least some example embodiments, the home gateway device 108 and one or more of the CPE devices may be issued by the service provider to the end-user in order to receive the subscribed services. In such cases, the service provider may already be aware of the identifiers associated with these issued devices. Contrastingly, for CPE devices that are not issued by the service provider (e.g. these CPE devices may be independently purchased and owned by the end-user), the service provider may directly collect the associated identifiers from the end-user, and/or automatically obtain the associated identifiers from the device itself or from other sources.

It will be appreciated that the subscriber profile data may include other types of information not specifically described herein. Additionally, at least some or all of the information in the subscriber profile data may not be stored on the OSS 110. Instead this information may be stored on another system, server or device, and which is accessible by the OSS 110.

The processor 340 may operate under stored program control and may execute software modules 360 stored on the memory 350. The software modules 360 may be comprised of, for example, operating system software 362, and one or more additional modules such as a device manager 364 to carry out specific functions of the OSS 110.

In at least some example embodiments, the device manager 364 may coordinate in the connection between an identified CPE device (on a subscriber's network) with a remote management server 114 (on the service provider's network) for management of the identified CPE. That is, the OSS 110 may communicate with other systems, servers or devices including the remote management server 114 and the home gateway device 108 to enable such a connection. For example, in at least some example embodiments, the OSS 110 may receive an instruction selecting a CPE device from one or more CPE devices within a subscriber's network (i.e. the LAN 107). The CPE device selected is subject to management by the remote management server 114 with such management functionalities including provisioning, updating, repairing, etc. of the selected CPE device. A CPE device may be selected for management by a variety ways which may include automatic or non-automatic processes. An example of automatic selection may include the OSS 110 determining CPE devices that need to be updated, with those requiring updating being automatically selected. An example of non-automatic selection may include the OSS 110 including or being associated with a call center that manages subscribed services for subscribers, and with a subscriber contacting the call center to report a problem with one of the CPE devices. In such cases, the call center agent may determine the CPE device experiencing problems based on identifying the subscriber and analyzing the subscriber's associated profile data. For example, the subscriber may inform the call center agent of a problem with the receiver in the subscriber's living room, and the call center agent may identify the particular problematic receiver within the subscriber's network by retrieving and reviewing the subscriber's profile data defining the subscriber's network and devices. An instruction to select the problematic CPE device (e.g. the receiver) is then inputted into the OSS 110 by the call center agent.

The device manager 364 may then retrieve, from memory 350 (e.g. from the data 370 area of memory 350), the identifiers associated with the home gateway device 108 servicing the selected CPE device, and of the selected CPE device. In at least some example embodiments, the identifiers retrieved may include the MAC addresses associated with these devices. The device manager 364 may then send a request to the remote management server 114 for the public IP address of the home gateway device 108 and the private IP address of the selected CPE device, with the request including the retrieved identifiers.

As mentioned above, the remote management server 114 stores (for example, in its memory) the IP addresses of the home gateway device 108 and of one or more CPE devices within a subscriber's network, for each subscriber. Further, the IP addresses of each of these devices may be stored correlated with other identifiers associated with these devices (such as, the MAC addresses). In at least some example embodiments, such information may be arranged within databases or data stores within its memory, with a database or data store containing the IP addresses and corresponding identifiers of all the devices for a subscriber.

In response to sending the request, the device manager 364 receives the public IP address of the home gateway device 108 and the private IP address of the selected CPE device from the remote management server 114. That is, upon receiving the request, the remote management server 114 retrieves, from its memory, the IP addresses of the gateway device 108 and the selected CPE device that correspond to the received identifiers included in the request, and sends these retrieved IP addresses to the OSS 110.

The device manager 364 then sends a request to the home gateway device 108 that is identified by its received public IP address to download a service module to enable a connection between the selected CPE device and the remote management server 114, with the request including the private IP address of the selected CPE device. By obtaining the public IP address of the home gateway device 108, the device manager 364 is aware of which subscriber's home gateway device 108 to send the request to. Additionally, as the request includes the private IP address of the selected CPE device, the home gateway device 108 is aware of which CPE device to establish the connection with, upon its provisioning by download and initiation of the service module.

Additionally, in at least some example embodiments, the OSS 110 may include or be associated with a web server. As such, the OSS 110 may be enabled for web service communication. In such example embodiments, the device manager 364 may be the module that is enabled for the web service communication (in which case, the device manager 364 may be included within the web server as part of the OSS 110). Similarly, the home gateway device 108 may also be enabled for web service communication in order that the communication may occur between the OSS 110 and the home gateway device 108 over web-based protocols. More particularly, in such example embodiments, the request to the home gateway device 108 may be a web-based HTTP request that includes the IP addresses of the home gateway device 108 and the selected CPE device (whose inclusion serve as identifiers to recognize the location of these devices within the network), and at least a parameter (whose inclusion serves as the trigger to initiate the download of the service module).

As mentioned above, the service module may be stored within a storage server 112, and the service module is downloaded from the storage server 112 by the home gateway device 108. Additionally, in at least some example embodiments, the storage server 112 may be implemented within the OSS 110. That is, the storage server 112 may be part of the OSS 110. In which case, the OSS 110, and more particularly the device manager 364, may receive the download request of the service module from the home gateway device 108. For example, the device manager 364 may receive a request, from the home gateway device 108 to download the service module. In response to receiving such a request, the device manager 364 sends the service module to the home gateway device 108 for download. For example, the device manager 364 may retrieve the service module from the storage server 112, and send it to the home gateway device 108.

In at least some example embodiments, other modules, such as the operating system 362 may perform some or all of the functions of the device manager 364. In at least some example embodiments, the device manager 364 may instead include a plurality of software modules rather than a single block as illustrated.

It will also be appreciated that the OSS 110 as illustrated in FIG. 3 is an example implementation of the OSS 110. In at least some example embodiments, the OSS 110 that is used may include different or other components, configurations and/or functions.

It will also be appreciated that although the OSS 110 and the remote management server 114 are configured to perform different functions, in at least some example embodiments, the remote management server 114 may include components similar to the OSS 110 as illustrated in FIG. 3. For example, the remote management server 114 may include a processor that controls the overall operation of the remote management server 114, and which is coupled to a communication subsystem and a memory. The communication subsystem allows for communication functions to be performed with other devices, systems and servers, via the WAN 105 or the access link 102. The memory may store different types of data and software modules. For example, the memory may store the IP addresses and other identifiers of associated subscriber devices (with the identifiers being organized within databases or data stores with each database or data store including the identifiers of devices of a subscriber). The software modules when executed may perform various functions and features of the remote management server 114 including the management of CPE devices on subscribers networks, as well as in initiating the connection between CPE devices and the remote management server 114 for management of these CPE devices (for example, by receiving the request for IP addresses from the OSS 110, and in response, sending the requisite IP addresses to the OSS 110). The remote management server 114 may also include other components not specifically described herein. Moreover, the remote management server 114 implemented may be of a different configuration than that described.

Facilitating a Connection

Figure 4:
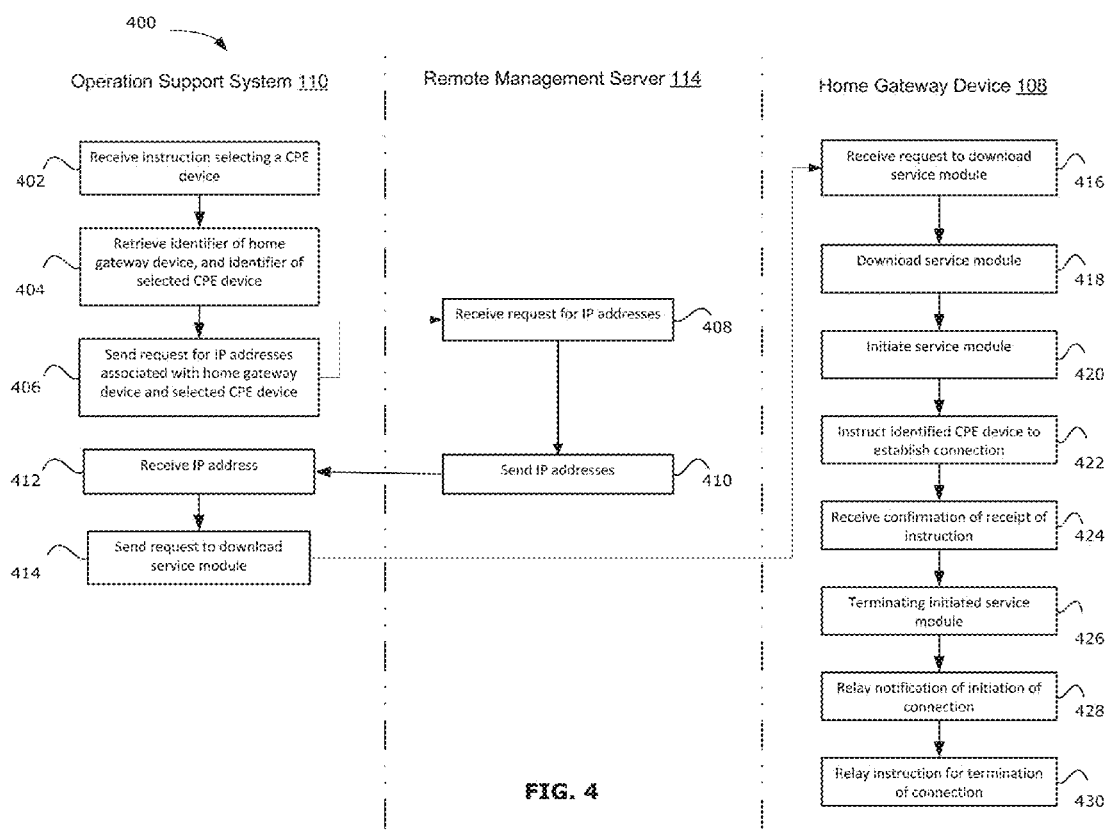
FIG. 4 shows a flowchart of an example method of facilitating a connection between two devices.

Referring now to FIG. 4, an example method 400 of facilitating a connection between a remote management server 114 and a CPE device 109 is illustrated in flowchart form. Portions of the method 400 may be implemented by the OSS 110, the remote management server 114 and the home gateway device 108. One or more modules on the OSS 110 (such as, the device manager 364), the remote management server 114 and the home gateway device 108 (such as, the service manager 264) may perform portions of the method 400. More particularly, these modules (such as, the device manager 364 and the service manager 264) may contain computer readable instructions causing associated processors within these servers and devices to perform their indicated functions.

The method 400 includes, at 402, the OSS 110 receiving an instruction to select a CPE device from a number of CPE devices within a subscriber's network (i.e. within a LAN 107). As the subscriber's network is a private network (such as a network within the subscriber's household), the CPE devices are typically allocated private IP addresses. In such cases, the selection may be inputted by an automatic or a non-automatic process. In an example automatic case, the OSS 110 or another device may identify a CPE device for selection, and automatically input such a selection within the OSS 110. In contrast, in an example non-automatic case, a user input may input the selection. For example, a service provider employee (such as, a call centre agent) may input the selection after reporting of the CPE device by a subscriber.

The OSS 110, at 404, retrieves from memory 350, identifiers (such as, the MAC addresses) associated with a home gateway device 108 that services the selected CPE device, and associated with the selected CPE device. The home gateway device 108 is also within the subscriber's network and is allocated a public IP address so that it may communicate with devices outside of the LAN 107 (such, as within the WAN 105), unlike the private IP allocated CPE devices 109. In such cases, communications between the CPE devices 109 and devices outside of the LAN 107 occurs via the home gateway device 108 which acts as an intermediary for these devices. Additionally, the OSS 110 stores subscriber profile data that includes information about devices within a subscriber's network. Such information includes the identifiers associated with these devices.

At 406, the OSS 110 sends a request to a remote management server 114 for the public IP address of the home gateway device 108 that services the selected CPE device, and the private IP address of the selected CPE device. The request further includes the retrieved identifiers associated with these devices.

The remote management server 114, at 408, receives the request for the IP addresses, and in response to the request, sends the requested IP addresses to the OSS 110. As mentioned above, the remote management server 114 may maintain a database of IP addresses and associated identifiers of devices within each subscriber's network. In such cases, after receiving the request, the remote management server 114 may compare the received identifiers from the OSS 110 with identifiers stored in the remote management server 114, and subsequently retrieve the IP addresses correlating with the stored identifiers that match the received identifiers. The retrieved IP addresses are then sent to the OSS 110 at 410.

At 412, the OSS 110 receives the sent IP addresses of the home gateway device 108 and the selected CPE device, from the remote management server 114.

Subsequently, the OSS 110, at 414, sends a request to the home gateway device 108 to download a service module for provisioning of the home gateway device 108 to enable a connection between the remote management server 114 and the selected CPE device. The OSS 110 identifies the home gateway device 108 for sending the request to based on its public IP address. That is, by receiving the home gateway device's public IP address, the OSS 110 is aware of the location of the home gateway device within the networks, and accordingly may communicate with it (e.g. by sending it the request). The request also includes the private IP address of the selected CPE device so that the home gateway device 108 is informed of the particular CPE device for which the connection needs to be established.

As mentioned above, in at least some example embodiments, the OSS 110 may include or be associated with a web server. As such, the OSS 110 is configured for web service communication. In such example embodiments, the communication with the home gateway device 108 (which may also be configured for web service communication) may be over a web-based protocol. More specifically, the request may be a web-based HTTP request with the request including the IP addresses of the home gateway device 108 and the selected CPE device, and at least one parameter (that acts as a trigger to initiate the downloading of the service module by the home gateway device 108).

At 416, the home gateway device 108 receives the request, from the OSS 110, to download the service module.

In response to receiving this request, the home gateway device 108, at 418, downloads the service module from the storage server 112. As mentioned above, the storage server 112 may be a server within the service provider's network, and which includes the service module. In at least some example embodiments, the storage server 112 is a web server that hosts the service module. In such example embodiments, the home gateway device 108 may store in memory the web address identifying the location of the service module, with the web address including the IP address of the storage server 112. Moreover, in such example embodiments, the home gateway device 108 may be configured for web service communication, and accordingly, may send a web-based HTTP request to the web address which points to the storage server 112, to download the service module.

It will also be appreciated that, in at least some example embodiments, the storage server 112 may be implemented within the OSS 110. In which case, the home gateway device 108 downloads the service module from the OSS 110 that includes the storage server 112 that stores the service module.

At 420, the home gateway device 108 initiates the downloaded service module. That is, the home gateway device 108 runs the service module on it.

In response to initiating the service module, the home gateway device 108, at 422, instructs the selected CPE device to establish the connection with the remote management server 114 (which is to occur via the home gateway device 108). The selected CPE device is identified for connection from a plurality of other CPE devices within the subscriber's network based on its IP address that is received from the OSS 110. The home gateway device 108 maintains the IP addresses of the CPE devices that it services (and which are located within a LAN 107), and accordingly may determine which CPE device to send the instruction to by matching the received IP address with a maintained IP address.

After sending the instruction to establish the connection, the home gateway device 108, at 424, may receive confirmation of receipt of the instruction from the selected CPE device. That is, the selected CPE device sends the confirmation to the home gateway device 108, upon receiving the instruction.

In response to receiving the confirmation, the home gateway device 108, at 426, may terminate the initiated service module. That is, running of the service module on the home gateway device 108 is ended.

At 428, the home gateway device 108 may relay a notification, from the selected CPE device to the remote management server 114, indicating initiation of the connection. Such a notification signifies commencement of the connection, and two-way communication may now occur between the selected CPE device and the remote management server 114, via the home gateway device 108. Additionally, in at least some example embodiments, one or more of the CPE devices (within the subscriber's network) including the selected CPE device may store the IP address of the remote management server 114. As such, the selected CPE device may identify the remote management server 114 with which to establish the connection, and send it the notification via the home gateway device 108.

When communication is to end between the selected CPE device and the remote management server 114, the home gateway device 108, at 430, may relay an instruction for termination of the connection from the remote management server 114 to the selected CPE device. For example, the remote management server 114 may send an instruction for termination of the connection to the home gateway device 108 and upon receipt of the instruction, the home gateway device 108 sends the instruction to the selected CPE device (i.e. the home gateway device 108 relays the instruction to the selected CPE device). In response to receiving the instruction from the home gateway device 108, the selected CPE device ends the connection, and communication between the selected CPE device and the remote management server 114 no longer occurs (unless the process mentioned above is repeated). Accordingly, the remote management server 114 instructs the selected CPE device to end the connection and the selected CPE device performs the termination process upon receiving the instruction.

As mentioned above, in at least some example embodiments, the connection between the selected CPE device and the remote management server 114 may be a layered TCP/IP connection. More particularly, the connection may be CWMP application layer connection as part of the TCP/IP connection. As such, communications between the selected CPE device and the remote management server may follow the standards of the CWMP protocol which include web-based HTTP requests and responses communications over the internet.

It will be appreciated that the service module is compatible for establishing the connection between a plurality of types of CPE devices and the remote management server 114. That is, the same service module may be downloaded and initiated on the home gateway device 108 regardless of the type of CPE device selected in order to facilitate the connection.

While the present disclosure is primarily described in terms of methods, a person of ordinary skill in the art will understand that the present disclosure is also directed to various apparatus, such as a server and/or an electronic device, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, and articles of manufacture also come within the scope of the present disclosure.

While the methods have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method implemented by a home gateway device to facilitate a connection between a remote management server and one or more customer-premises equipment (CPE) devices, the one or more CPE devices located within a local area network and serviced by the home gateway device, with each CPE device being allocated a private internet-protocol (IP) address, and the remote management server located within a wide area network and being allocated a public IP address, the method comprising:
   receiving, from an operation support system, a request to download a service module stored on a storage server, the request including an identifier associated with one of the CPE devices;
   in response to receiving the request, downloading the service module from the storage server;
   initiating the downloaded service module on the home gateway device; and
   in response to initiating the service module, instructing an identified one of the CPE devices based on the identifier to establish the connection with the remote management server via the home gateway device.

2. The method of claim 1, further comprising:
   receiving confirmation, from the identified CPE device, of receipt of the sent instruction to establish the connection; and
   in response to receiving the confirmation, terminating the initiated service module on the home gateway device.

3. The method of claim 1, wherein the connection defines a layered Transmission Control Protocol (TCP)/Internet protocol (IP) connection for communication between the identified CPE device and the remote management server.

4. The method of claim 3, wherein the remote management service is an auto-configuration server, and wherein the TCP/IP connection includes an application layer protocol connection that defines a Customer-Premises Equipment Wide Area Network Management Protocol (CWMP) connection for communication between the identified CPE device and the auto-configuration server.

5. The method of claim 1, wherein the home gateway device stores in memory a web address that includes an IP address of the storage server that stores the service module, and wherein downloading includes retrieving the service module from the web address.

6. The method of claim 1, wherein one or more of the CPE devices store the public IP address of the remote management server in order to identify the remote management server when establishing the connection.

7. The method of claim 1, further comprising after sending the instruction to establish the connection, relaying a notification, from the identified CPE device to the remote management server, indicating initiation of the connection.

8. The method of claim 7, further comprising after initiation of the connection, relaying an instruction, from the remote management server to the identified CPE device, for termination of the connection.

9. The method of claim 1, wherein the downloaded service module is compatible for establishing the connection between a plurality of types of CPE devices and the remote management server.

10. The method of claim 1, wherein the identifier is the private IP address of the identified CPE device.

11. The method of claim 1, wherein the storage server is implemented on the operation support system.

12. A home gateway device to facilitate a connection between a remote management server and one or more customer-premises equipment (CPE) devices, the one or more CPE devices located within a local area network and serviced by the home gateway device, with each CPE device being allocated a private internet-protocol (IP) address, and the remote management server located within a wide area network and being allocated a public IP address, the home gateway device comprising:
   a communication subsystem;
   a memory; and
   a processor coupled to the communication subsystem and the memory, the processor configured to:
   receive, from an operation support system, a request to download a service module stored on a storage server, the request including an identifier associated with one of the CPE devices;
   in response to receiving the request, download the service module from the storage server;
   initiate the downloaded service module on the home gateway device; and
   in response to initiating the service module, instruct an identified one of the CPE devices based on the identifier to establish the connection with the remote management server via the home gateway device.

13. The home gateway device of claim 12, further configured to:
  receive confirmation, from the identified CPE device, of receipt of the sent instruction to establish the connection; and
  in response to receiving the confirmation, terminate the initiated service module on the home gateway device.

14. The home gateway device of claim 12, wherein the connection defines a layered Transmission Control Protocol (TCP)/Internet protocol (IP) connection for communication between the identified CPE device and the remote management server.

15. The home gateway device of claim 14, wherein the remote management service is an auto-configuration server, and wherein the TCP/IP connection includes an application layer protocol connection that defines a Customer-Premises Equipment Wide Area Network Management Protocol (CWMP) connection for communication between the identified CPE device and auto-configuration server.

16. The home gateway device of claim 12, wherein the home gateway device stores in memory a web address that includes an IP address of the storage server that stores the service module, and wherein downloading includes retrieving the service module from the web address.

* * * * *